(12) United States Patent
Rehmeyer et al.

(10) Patent No.: US 10,242,643 B2
(45) Date of Patent: Mar. 26, 2019

(54) CONSTRAINED HEAD-MOUNTED DISPLAY COMMUNICATION

(71) Applicant: MICROSOFT TECHNOLOGY LICENSING, LLC, Redmond, WA (US)

(72) Inventors: Eric Scott Rehmeyer, Kirkland, WA (US); David Evans, Bellevue, WA (US); Karim A. Luccin, Redmond, WA (US); Jeffrey Kohler, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/213,151

(22) Filed: Jul. 18, 2016

(65) Prior Publication Data
US 2018/0018933 A1    Jan. 18, 2018

(51) Int. Cl.
*G02B 27/01* (2006.01)
*A63F 13/30* (2014.01)
(Continued)

(52) U.S. Cl.
CPC .............. *G09G 5/006* (2013.01); *A63F 13/26* (2014.09); *A63F 13/30* (2014.09); *G02B 27/017* (2013.01);
(Continued)

(58) Field of Classification Search
None
See application file for complete search history.

(56) References Cited

U.S. PATENT DOCUMENTS

| 8,564,622 B1 | 10/2013 | Quinn et al. |
| 8,581,905 B2 | 11/2013 | Mitchell |

(Continued)

FOREIGN PATENT DOCUMENTS

| EP | 2769270 A1 | 8/2014 |
| WO | 2006066919 A1 | 6/2006 |

(Continued)

OTHER PUBLICATIONS

Balogh, et al., "A Scalable Hardware and Software System for the Holographic Display of Interactive Graphics Applications", In Proceedings of annual conference of the European Association for Computer Graphics, Aug. 29, 2005, 4 pages.

(Continued)

*Primary Examiner* — Joni Richer
(74) *Attorney, Agent, or Firm* — Alleman Hall Creasman & Tuttle LLP

(57) ABSTRACT

Examples are disclosed herein that relate to constraining communication among HMD devices. One example provides a computing system comprising a logic machine and a storage machine holding instructions. The instructions are executable to receive, for each of a plurality of head-mounted display devices, vantage point data, determine, for each of the plurality of head-mounted display devices, whether one or more other head-mounted display devices are within a vantage point scope of that head-mounted display device, the vantage point scope being based on the vantage point data of that head-mounted display device, and constrain, for each of one or more head-mounted display devices, delivery of communication data from that head-mounted display device to one or more of the plurality of head-mounted display devices, such constraint based on whether that head-mounted display device is within the (Continued)

vantage point scope of one or more of the plurality of head-mounted display devices.

19 Claims, 4 Drawing Sheets

(51) Int. Cl.
  *A63F 13/26* (2014.01)
  *G09G 5/00* (2006.01)
  *G06F 3/01* (2006.01)
(52) U.S. Cl.
  CPC .............. *G06F 3/011* (2013.01); *G06F 3/012* (2013.01); *G09G 2370/04* (2013.01)

(56) References Cited

U.S. PATENT DOCUMENTS

| | | | |
|---|---|---|---|
| 8,704,879 B1 | 4/2014 | Cheng et al. | |
| 9,098,112 B2 | 8/2015 | Cheng et al. | |
| 2005/0254453 A1* | 11/2005 | Barneah | H04N 21/4126 370/328 |
| 2006/0119572 A1 | 6/2006 | Lanier | |
| 2013/0084970 A1* | 4/2013 | Geisner | A63F 13/216 463/29 |
| 2013/0293468 A1 | 11/2013 | Perez et al. | |
| 2013/0326364 A1 | 12/2013 | Latta et al. | |
| 2013/0339159 A1* | 12/2013 | Shaikh | G06Q 30/0643 705/14.73 |
| 2014/0063008 A1 | 3/2014 | Mitchell et al. | |
| 2014/0267564 A1* | 9/2014 | Pourashraf | G06T 15/20 348/14.08 |
| 2014/0267599 A1 | 9/2014 | Drouin et al. | |
| 2014/0300633 A1* | 10/2014 | Sako | G06K 9/00671 345/633 |
| 2014/0306994 A1* | 10/2014 | Brown | G06T 19/006 345/633 |
| 2016/0093108 A1* | 3/2016 | Mao | A63F 13/42 345/633 |
| 2018/0091577 A1* | 3/2018 | Park | G06Q 50/10 |

FOREIGN PATENT DOCUMENTS

| | | |
|---|---|---|
| WO | 2009121380 A1 | 10/2009 |
| WO | 2014088972 A1 | 6/2014 |
| WO | 2015065860 A1 | 5/2015 |

OTHER PUBLICATIONS

"International Search Report and Written Opinion Issued in PCT Application No. PCT/US2017/041811", dated Sep. 12, 2017, 11 Pages.

* cited by examiner

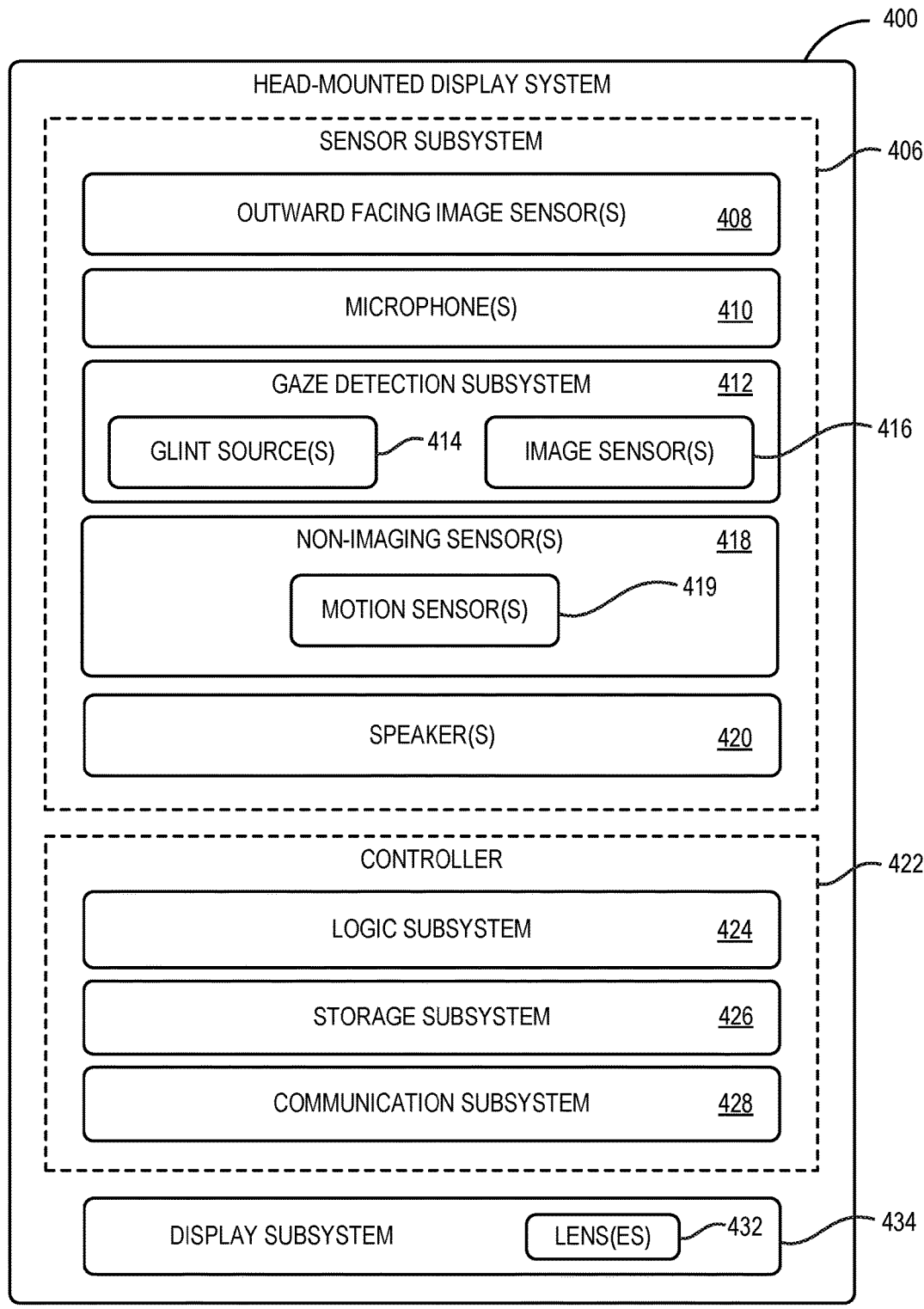

CONSTRAINED HEAD-MOUNTED DISPLAY COMMUNICATION

BACKGROUND

In some virtual reality applications, multiple users with head-mounted display (HMD) devices can interact to enable a collaborative mixed or virtual reality environment. Virtual objects and other imagery may be observed in the collaborative environment, and a shared experience may be achieved via information sharing (e.g., about observed imagery) between devices. However, the data transmission necessary to create a shared experience can present bandwidth and other communication issues.

BRIEF DESCRIPTION OF THE DRAWINGS

FIG. 4 shows a block diagram of an example HMD device system.

DETAILED DESCRIPTION

As described above, in some scenarios multiple head-mounted display (HMD) devices exchange data to enable a collaborative mixed or virtual reality environment. Virtual objects and other imagery may be observed in the collaborative mixed reality environment—for example, data may be shared so that multiple HMD devices can observe a virtual three-dimensional object from their respective perspectives in a physically realistic manner. To this end, network connections may be established with which data regarding the vantage point of HMD devices is shared. i.e., data associated with objects or other HMD users within a field-of-view.

Even a modest number of HMD devices can present bandwidth and other communication issues. For example, frequent sharing of vantage point data among a plurality of HMD devices may strain network connections, potentially leading to dropped communications and other suboptimal network performance. For implementations in which a centralized computing system mediates HMD device communication, similar strain may occur at the computing system, as high volumes of vantage point data are received and processed. In either case, compromised communication can degrade the collaborative experience, for example by causing faulty or incomplete rendering of virtual objects, or discontinuous or uneven updates to virtual object position and/or orientation.

Accordingly, examples are disclosed herein that relate to constraining communication among HMD devices in order to efficiently allocate bandwidth and provide other advantages. One example provides a computing system having a logic machine (e.g., processor) and a storage machine (e.g., disk array) holding instructions. The instructions may be executable to (1) receive, for each of a plurality of head-mounted display devices, vantage point data, (2) determine, for each of the plurality of head-mounted display devices, whether one or more other head-mounted display devices are within a vantage point scope of that head-mounted display device, the vantage point scope being based on the vantage point data of that head-mounted display device, and (3) constrain, for each of one or more head-mounted display devices, delivery of communication data from that head-mounted display device to one or more of the plurality of head-mounted display devices. The constraint may be based on whether the head-mounted display device is within the vantage point scope of one or more of the plurality of head-mounted display devices.

Figure 1:
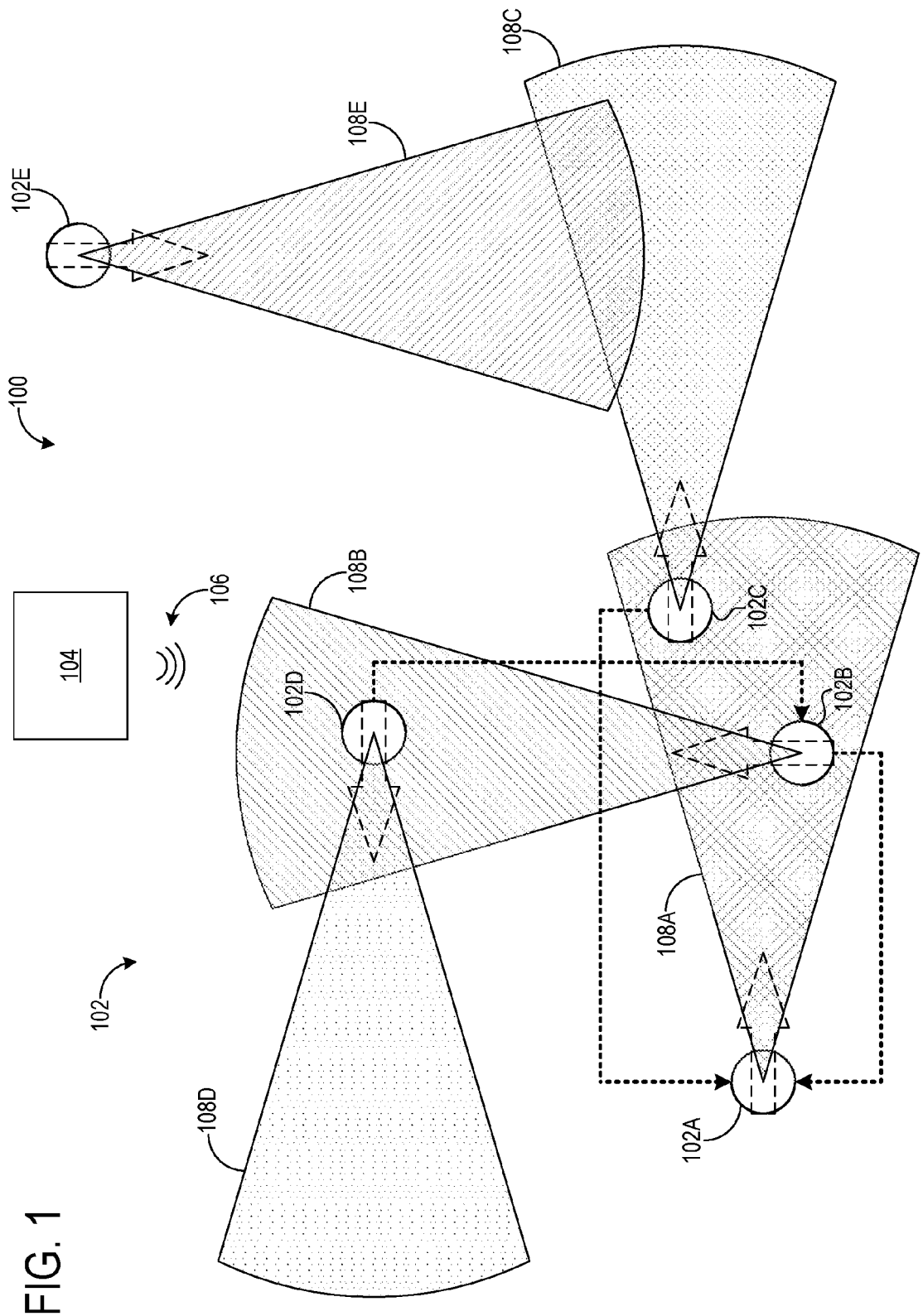
FIG. 1 depicts an example use environment with multiple head-mounted display (HMD) devices.

FIG. 1 schematically depicts an example use environment 100 with multiple HMD devices 102. HMD devices 102 may include see-through displays that are at least partially transmissive to background light and enable the presentation of mixed reality imagery—including virtual imagery and real world imagery—to wearers of the HMD devices. Further, HMD devices 102 may exchange data to enable a collaborative mixed reality environment in use environment 100. The approaches described herein are applicable to collaborative virtual reality environments, however, in which virtual reality imagery is presented via immersive virtual reality HMD devices, for example. Various mixed reality imagery may be presented in the collaborative mixed reality environment—for example, virtual objects that can be viewed from the different perspectives of HMD devices 102 (e.g., displayed at fixed locations in environment 100 in a physically realistic manner); information regarding individual HMD devices and/or wearers thereof (e.g., biographical information regarding wearers and/or application information, for example displayed via suitable indicia such as an icon or caption that appears at a fixed position and/or orientation relative to the HMD devices); etc. An example collaborative mixed reality environment is described below with reference to FIG. 2. Detail regarding an example HMD device is described below with reference to FIG. 4.

To avoid high volumes of data transmission in use environment 100 and potential negative impacts on user experience, communication in the use environment may be intelligently and dynamically constrained. To this end, a computing system communicatively coupled to HMD devices 102 may constrain communication among the HMD devices. FIG. 1 shows a computing system in the form of a computing device 104, which is communicatively coupled to HMD devices 102 via a network, generally indicated at 106. Computing device 104 may be a server computing device or any other capable device/system, including smartphones, tablets, laptops, gaming consoles, other HMD devices, routers and other infrastructure devices, cloud networks, etc. Still further, the functionality described herein may reside on a single device or may be distributed across multiple devices. When the constraint management is implemented on an HMD device 102, network 106 may be implemented as a peer-to-peer network among various HMD devices 102, for example, in which an HMD device may function as a communication relay.

The computing system may constrain HMD communication based on the vantage point scope (VPS) of HMD devices 102. The VPS of an HMD device 102 provides a mechanism with which HMD communication can be selectively constrained, and may be based on a variety of aspects relating to the spatial state of an HMD device, the application state of an HMD device, environment 100, and/or other considerations. As one example, FIG. 1 illustrates VPS determination for each HMD device 102 in environment 100 based on the corresponding field-of-view (FOV) 108 (e.g., view frustum) of that corresponding HMD device. The computing system may determine, for each HMD device 102, the FOV 108 of that HMD device based on vantage point data received from that HMD device. The vantage point data may include any suitable information, such as a location (e.g., x/y coordinate), orientation (e.g., angular orientation), and/or FOV (e.g., if not already known by the computing system) of a corresponding HMD device. For a given HMD device 102, the computing system may constrain communication with other HMD devices to only those HMD devices within the FOV 108 of the given HMD device, such that HMD devices not in that FOV do not communicate with the given HMD device. Using HMD device FOV in this way may provide a simple mechanism for intelligently managing HMD device communication without inhibiting desired communication, as HMD device wearers are likelier to desire interaction with HMD devices within their FOVs over HMD devices outside of their FOVs.

To further illustrate constrained HMD communication on the basis of FOV, FIG. 1 shows an HMD device 102A within whose FOV 108A are HMD devices 102B and 102C. As a result of the presence of HMD devices 102B and 102C in FOV 108A, the computing system may sanction the transfer of communication data from these HMD devices to HMD device 102A. As HMD device 102A is not within the respective FOVs 108I and 108C of HMD devices 102B and 102C, however, the computing system may not sanction communication data transfer from HMD device 102A to HMD devices 102B and 102C. Similarly, an HMD device 102D is within FOV 108B of HMD device 102B, and as such, the transfer of communication data from HMD device 102D to HMD device 102B may be sanctioned. As no HMD device 102 is within FOV 108D of HMD device 102D, nor within FOV 108C of HMD device 102C or within a FOV 108E of an HMD device 102E, communication data transfer to these HMD devices is not sanctioned.

FIG. 1 illustrates other potential aspects of constraining HMD device communication. For example, while FOV 108C of HMD device 102C and FOV 108E of HMD device 102E partially overlap, communication between these HMD devices is not sanctioned as neither HMD device is within the FOV of the other HMD device. Approaches are contemplated, however, in which communication data transfer is sanctioned in response to FOV overlap. Further, the spatial extent of each FOV 108 may be constrained—e.g., in a radial direction and/or along an optical axis of the corresponding HMD device 102. In this way, HMD communication can be constrained and excessive strain on network 106 avoided while preserving a desired user experience, as HMD communication may be desired with a greater likelihood for proximate HMD devices than for those that are located relatively farther away, even if within a FOV. The spatial extent of each FOV 108 may assume any suitable value or form, however, and in some examples may be dynamically adjusted.

Alternative or additional manners of constraining data transmission in use environment 100 are contemplated. For example, HMD devices 102 may transmit vantage point data to the computing system at a frequency lower than a frequency at which communication data transfer to an HMD device from another HMD device occurs. Since the frequency at which HMD device presence in a FOV 108 changes may be less than the frequency at which an HMD device within the VPS of another HMD device changes location and/or orientation, this approach may accommodate both reduced data transmission in network 106 and a desired user experience enabled by sufficiently frequent HMD communication data transmission that allows the display of mixed reality imagery regarding an HMD device 102 that is continuous and responsive to changes in the location, orientation, and/or other properties of an HMD device described below.

The computing system may constrain HMD device communication in various suitable manners. For example, upon determining that HMD device 102B is within FOV 108A of HMD device 102A, the computing system may issue instructions to HMD device 102B permitting that HMD device to deliver communication data to HMD device 102A. In such an approach, explicit permission to communicate issued by the computing system enables communication such that an HMD device 102 does not deliver communication data without first receiving such permission. In other approaches, HMD devices 102 may have permission to communicate with other HMD devices by default, and the computing system may instead issue instructions that forbid an HMD device to deliver communication data to other HMD devices.

Figure 2:
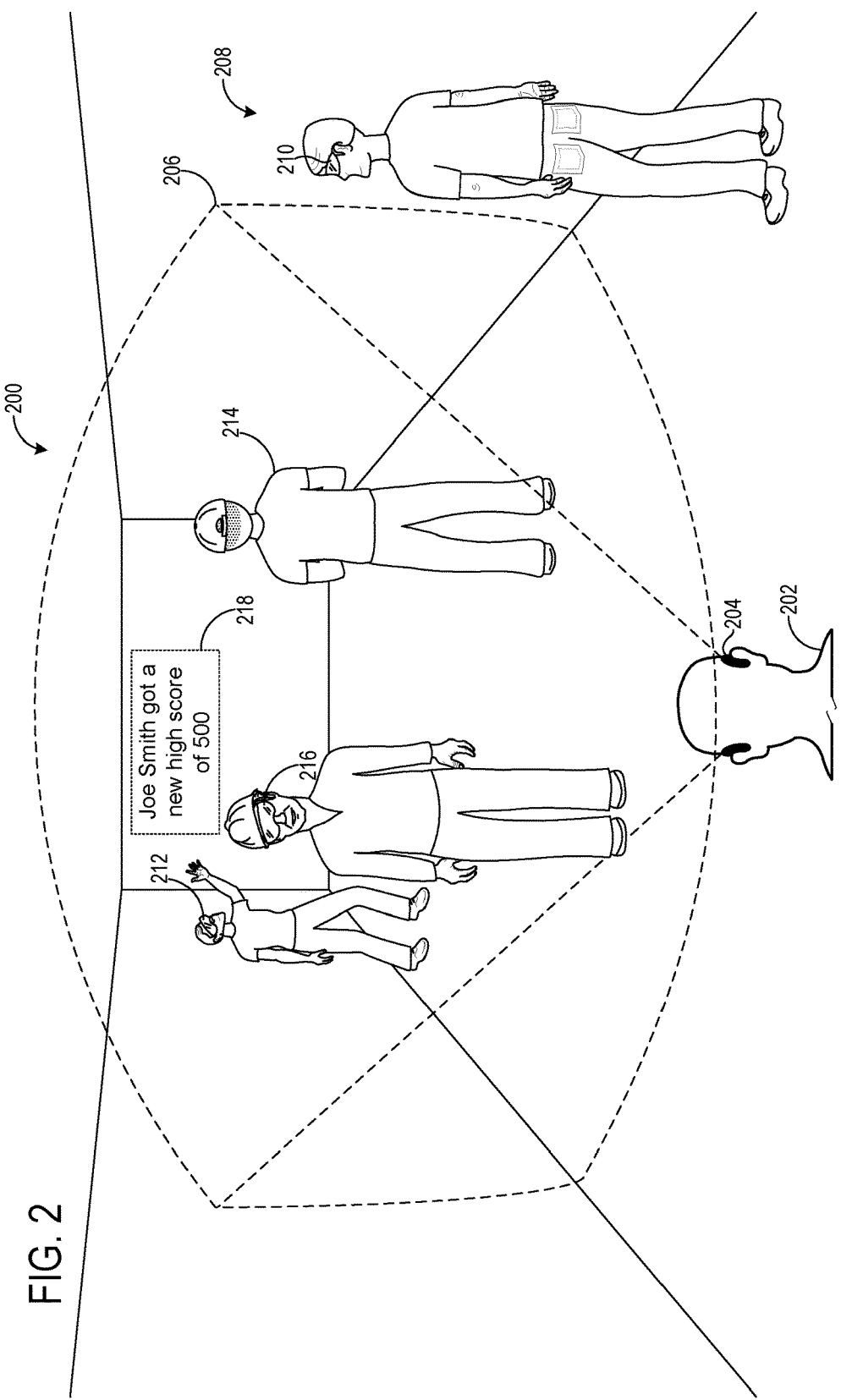
FIG. 2 shows an example collaborative mixed reality environment.

VPS determination may account for other criteria alternatively or in addition to HMD device FOV. FIG. 2 shows an example collaborative mixed reality environment 200. In particular, environment 200 is shown from the perspective of a wearer 202 of an HMD device 204, which may be one of the HMD devices 102 in FIG. 1. In the example depicted in FIG. 2, an HMD device 204 may include a FOV 206 having a region of interest (ROI) 208 outside of the FOV. An HMD device 210 approaching FOV 206 of HMD device 204 from ROI 208 may be included in the VPS of HMD device 204. To this end, the computing system described above (e.g., computing device 104 of FIG. 1) may consider changes in HMD device location and/or orientation to determine whether an HMD device is approaching the FOV of another HMD device. Other considerations may include the distance of an HMD device 102 from the FOV of another HMD device (e.g., at the time of determination), the speed of approach, and/or an estimated time-of-arrival at which the HMD device is anticipated to enter the FOV of the other HMD device. In this approach, HMD devices not yet within the FOV of another HMD device but whose imminent presence in the FOV is expected can be included in the VPS of the other HMD device, which may reduce the latency of mixed reality imagery display.

An HMD device priority may be utilized in identifying HMD devices within the VPS of HMD device 204. In this example, a prioritized HMD device may be included in VPS of HMD device 204, whereas a deprioritized HMD device may be excluded from the VPS of the HMD device, with both HMD devices being respectively included and excluded from the VPS according to the HMD device priority. HMD device prioritization may consider various suitable criteria. For example, the computing system may perform HMD device prioritization for HMD device 204 based on the location and/or orientation of other HMD devices relative to environment 200 and/or relative to HMD device 204. HMD devices located farther than a threshold distance away from HMD device 204 may be deprioritized, such as an HMD device 212, for example. As another example, HMD devices outside a range of angular orientations relative to HMD device 204) may be deprioritized, such as an HMD device worn by a wearer 214, as the wearer and corresponding HMD device are facing away from HMD device 204 and are at least partially imperceptible from its perspective. HMD devices may be similarly deprioritized when occluded by other elements in environment 200—e.g., HMD wearers, objects.

HMD device prioritization may consider HMD device location and/or orientation within the display space of an HMD device wearer—for example, HMD devices closer to the center of FOV 206 may be prioritized, and HMD devices closer to the periphery of the FOV may be deprioritized. To this end, the vantage point data transmitted by HMD device 204 to the computing system may include image data, alternatively or in addition to location and/or orientation data. As yet another example, the deprioritized HMD devices may be substantially stationary HMD devices. The computing system may, for example, compare changes in HMD device location and/or orientation to respective thresholds to determine whether an HMD device is substantially stationary.

Determining whether HMD devices are within the VPS of HMD device 204 may include identifying a maximum number of HMD devices within the VPS. Additional HMD devices exceeding the maximum number may be excluded from the VPS. For example, three HMD devices may be established as the maximum number of HMD devices to be prioritized for HMD device 204, and as such, HMD device 210, the HMD device worn by wearer 214, and an HMD device 216 may be prioritized, whereas the fourth HMD device 212 may be deprioritized.

In yet other examples, HMD prioritization may include assessing the engagement of HMD device wearers. As an example, HMD device 216 may be prioritized as its wearer is considered likely to be engaging wearer 202, whereas the HMD device of wearer 214 may be deprioritized as the wearer is considered less likely or unlikely to be engaging wearer 202. User engagement may be evaluated in various suitable manners, including but not limited to image-based evaluation (e.g., face detection, facial expression evaluation), eye-tracking-based evaluation (e.g., identifying gaze direction), body language evaluation (e.g., based on image data, posture and/or gesture assessment), and/or audio-based evaluation (e.g., identifying aspects of wearer conversation including salutations). Detail regarding HMD device hardware that may be used to assess user engagement is described below with reference to FIG. 4.

HMD device prioritization may be used to prioritize HMD device communication, alternatively or in addition to determining HMD device membership in a VPS. For example, the delivery of communication data from one or more HMD devices determined to be within the VPS of another HMD device may be prioritized, according to one or more of the criteria described above. Prioritized communication may manifest in a variety of suitable forms, such as higher data transfer rates, more frequent communication, more immediate communication, etc.

An HMD device may transmit state data regarding its state alternatively or in addition to transmitting vantage point data. The state data may include any suitable information, such as an indication of application(s) running on the HMD device and/or aspects of running application(s)— e.g., a song being played back in a music application, a score in a videogame application. State data alternatively or additionally may include information regarding a wearer of the corresponding HMD device, including but not limited to an identity of the wearer, other biographical information of the wearer, etc. Further, state data may include information regarding the output from one or more sensors of an HMD device. As an illustrative example, FIG. 2 shows the presentation of state data on HMD device 204 regarding the wearer of HMD device 216 in the form of a caption 218, which indicates that the wearer has achieved a new high score in a videogame application. State data may be presented in any suitable form, however. Still further, state data may be used in identifying and/or prioritizing HMD devices within the VPS of another HMD device—for example, applications, application states, and/or aspects of HMD device wearers may be stipulated such that HMD devices or wearers that do not satisfy these conditions are excluded from, or deprioritized in, the FOV of the other HMD device. As one example, HMD device 216 may be included in the VPS of HMD device 204, as HMD device 216 is running a game application considered relevant by HMD device 204, whereas the HMD device worn by wearer 214 is not included in the VPS by virtue of not running the game application. In some examples, inactive HMD devices (e.g., those in an idle state or those not actively executing an application) may be excluded from a VPS.

The determination of HMD device membership in a VPS of another HMD device may be performed in view of network conditions such as those of network 106 (FIG. 1). As such, HMD device prioritization, vantage point data transmission, and/or state data transmission may be controlled in view of network conditions. The consideration of network conditions in determining HMD device presence in a VPS may enable the provision of a collaborative mixed reality environment such as environment 200 (FIG. 2) in desired manners that avoid issues that degrade the user experience, such as network interference and dropped communications. As network conditions may change over time, various criteria with which HMD device presence in a VPS is determined may be dynamically selected. To this end, various network conditions may be considered, including but not limited to bandwidth usage and/or throughput. Further, VPS determination may be constrained in response to the observation that dropped communications in a network have occurred.

One or more of the criteria described above considered in VPS determination may be dynamically selected in view of network conditions. As examples, the size of ROI 208 may be scaled (e.g., expanded for favorable network conditions, contracted for unfavorable network conditions); the magnitude of HMD device approach to FOV 206 from ROI 208 may be scaled (e.g., such that HMD devices approaching the FOV at slower speeds are included in the VPS of HMD device 204 for favorable network conditions, whereas HMD devices included in the VPS are constrained to those approaching at relatively higher speeds for unfavorable network conditions); the maximum number of HMD devices included in the VPS may be scaled (e.g., increased for favorable network conditions, decreased for unfavorable network conditions); and/or the threshold distance and/or angular orientation range for which HMD devices are included in the VPS may be scaled (e.g., increased for favorable network conditions, decreased for unfavorable network conditions)

As alternative or additional examples of criteria that may be scaled in determining VPS membership, the angular range for which HMD devices are included in the VPS in display space may be scaled (e.g., increased for favorable network conditions, decreased for unfavorable network conditions); the degrees of user engagement that prompt VPS inclusion may be scaled (e.g., increased for favorable network conditions, decreased for unfavorable network conditions); the degrees of HMD device/user occlusion may be scaled (e.g., increased for favorable network conditions, decreased for unfavorable network conditions); and/or the range of state information for which HMD devices are included in the VPS may be scaled (e.g., less relevant state information leading to VPS inclusion for favorable network conditions, more relevant state information required for VPS inclusion for favorable network conditions). In view of the above, any suitable combination of the criteria described above, among other potential criteria, may be considered in determining HMD device presence in a VPS, and one or more of such criteria may be dynamically scaled in response to any suitable aspect of the condition of a network.

Figure 3:
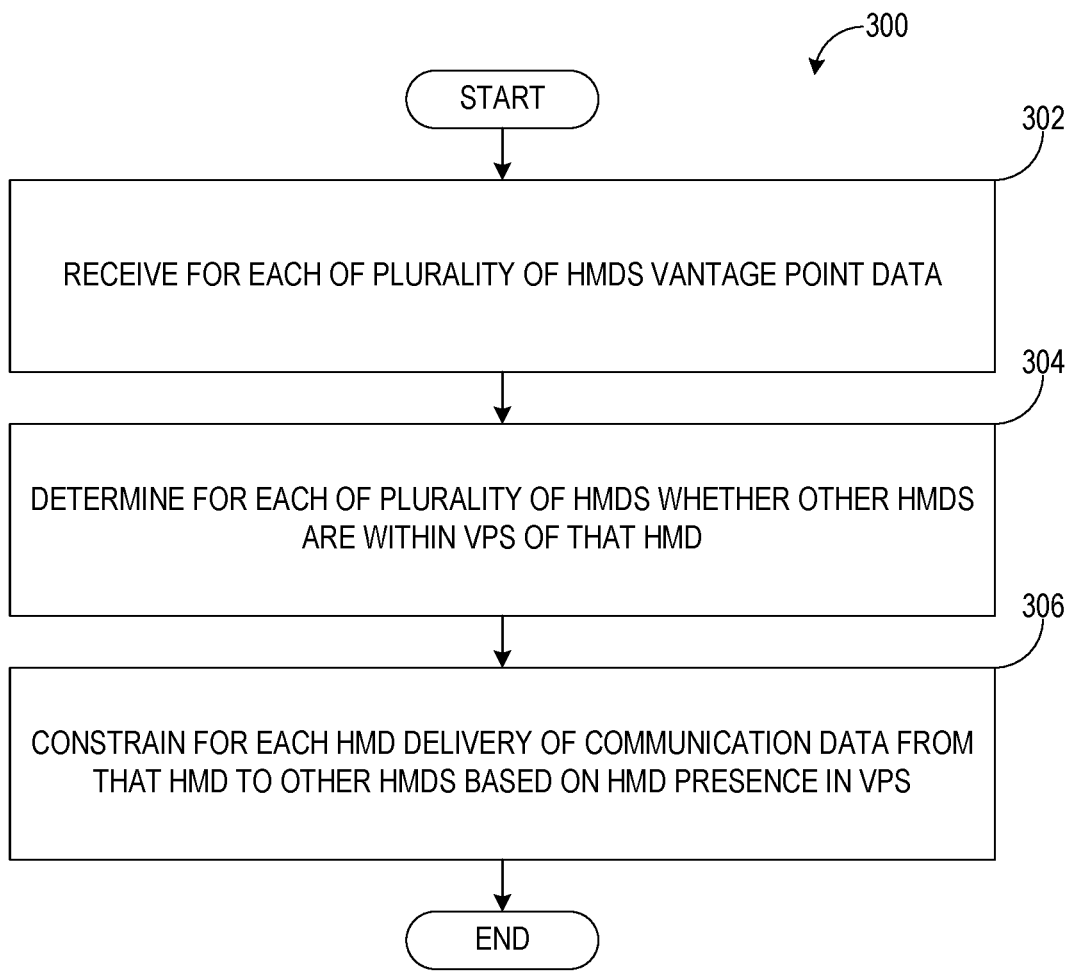
FIG. 3 shows a flowchart illustrating a method of managing HMD device communication.

FIG. 3 shows a flowchart illustrating a method 300 of managing HMD device communication. Method 300 may be performed on a suitable computing system such as computing device 104 of FIG. 1.

At 302, method 300 includes receiving, for each of a plurality of HMD devices, vantage point data. The plurality of HMD devices may be the plurality of HMD devices 102 of FIG. 1, for example. The vantage point data may include various suitable data, including but not limited to HMD device location data, orientation data, optical data (e.g., FOV, view frustum) image data, gaze-tracking data, audio data, depth data, etc. The vantage point data may be received via network 106 of FIG. 1, for example. Alternatively or in addition to vantage point data, state data (e.g., application state data, wearer identity/biographical information) may be received for the plurality of HMD devices.

At 304, method 300 includes determining, for each of the plurality of HMD devices, whether one or more other HMD devices are within a VPS of that HMD device. The VPS may be based on and associated with the vantage point data of that HMD device. The determination of HMD device presence in the VPS may include considerations of HMD device location and/or orientation, changes in HMD device location and/or orientation, HMD device location and/or orientation in HMD device display space, degrees of HMD device approach from an ROI outside of an HMD device FOV, and/or HMD device prioritization (e.g., based on one or more of HMD device motion, activity/inactivity, occlusion, maximum number, application state, wearer engagement). One or more of the criteria with which HMD presence in the VPS may be dynamically scaled in response to network conditions (e.g., bandwidth, throughput, dropped communications). The FOV may be FOV 206 and the ROI may be ROI 208, both of HMD device 204 of FIG. 2, for example.

At 306, method 300 includes constraining, for each of one or more HMD devices, delivery of communication data from that HMD device to one or more of the plurality of HMD devices. Such constraint may be based on whether that HMD device is within the VPS of one or more of the plurality of HMD devices. Communication data delivery may be constrained in various suitable manners, including but not limited to on the basis of instructions issued by the computing system that give permission to HMD devices to communication, or on the basis of instructions issued by the computing system that disallow HMD devices from communicating.

FIG. 4 shows a block diagram of an example head-mounted display system 400. The head-mounted display devices 102 of FIG. 1 represent an example implementation of head-mounted display system 400 in which the examples described herein may be implemented. Display system 400 includes a sensor subsystem 406, which may include one or more outward-facing image sensors 408 configured to acquire images of a real-world environment, such as to help determine the position of the display system 400 relative to the real-world environment, and one or more microphones 410 configured to detect sounds, such as user speech inputs. Outward-facing image sensors 408 may include one or more depth sensor(s) and/or one or more two-dimensional image sensor(s) (e.g. RGB image sensors). Head-mounted display system 400 may display completely virtual images, may display video-based augmented reality images via a viewfinder mode using data from an outward-facing image sensor, or may display augmented reality images (e.g. mixed reality images) via a see-through display subsystem.

Sensor subsystem 406 may further include a gaze detection subsystem 412 configured to detect a gaze direction of a user, e.g. as user input for computing device actions. Gaze detection subsystem 412 may be configured to determine gaze directions of each of a user's eyes in any suitable manner. For example, in the depicted embodiment, gaze detection subsystem 412 comprises one or more glint sources 414, such as infrared light sources configured to cause a glint of light to reflect from each eyeball of a user, and one or more image sensor(s) 416, such as inward-facing sensors, configured to capture an image of each eyeball of the user. Changes in the glints from the user's eyeballs and/or a location of a user's pupil as determined from image data gathered via the image sensor(s) 416 may be used to determine a direction of gaze. In other examples, gaze detection subsystem 412 may be omitted.

Display system 400 also may include additional sensors, as mentioned above. For example, display system 400 may include non-imaging sensor(s) 418, examples of which may include but are not limited to a global positioning system (GPS) sensor, and one or more motion sensor(s) 419, such as an accelerometer, a gyroscopic sensor, and/or an inertial measurement unit (IMU).

Motion sensors 419, as well as microphone(s) 410 and gaze detection subsystem 412, also may be employed as user input devices, such that a user may interact with the display system 400 via gestures of the eye, neck and/or head, as well as via verbal commands. It will be understood that sensors illustrated in FIG. 4 are shown for the purpose of example and are not intended to be limiting in any manner, as any other suitable sensors and/or combination of sensors may be utilized.

Display system 400 further includes one or more speaker(s) 420, for example, to provide audio outputs to a user for user interactions. Display system 400 further includes a controller 422 having a logic subsystem 424 and a storage subsystem 426 in communication with the sensors, a communication subsystem 428, and/or other components.

Logic subsystem 424 includes one or more physical devices configured to execute instructions. For example, logic subsystem 424 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 424 may include one or more processors configured to execute software instructions. Additionally or alternatively, logic subsystem 424 may include one or more hardware or firmware logic subsystems configured to execute hardware or firmware instructions. Processors of logic subsystem 424 may be single-core or multi-core, and the instructions executed thereon may be configured for sequential, parallel, and/or distributed processing. Individual components of logic subsystem 424 optionally may be distributed among two or more separate devices, which may be remotely located and/or configured for coordinated processing. Aspects of logic subsystem 424 may be virtualized and executed by remotely accessible, networked computing devices configured in a cloud-computing configuration.

Storage subsystem 426 includes one or more physical devices configured to hold instructions executable by the logic subsystem to implement the methods and processes described herein. When such methods and processes are implemented, the state of storage subsystem 426 may be transformed—e.g., to hold different data.

Storage subsystem 426 may include removable and/or built-in devices. Storage subsystem 426 may include optical memory (e.g., CD, DVD, HD-DVD. Blu-Ray Disc, etc.), semiconductor memory (e.g., RAM. EPROM, EEPROM, etc.), and/or magnetic memory (e.g., hard-disk drive, floppy-disk drive, tape drive, MRAM, etc.), among others. Storage subsystem 426 may include volatile, nonvolatile, dynamic, static, read/write, read-only, random-access, sequential-access, location-addressable, file-addressable, and/or content-addressable devices.

It will be appreciated that storage subsystem 426 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 424 and storage subsystem 426 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Communication subsystem 428 may be configured to communicatively couple the display system 400 with one or more other computing devices. Communication subsystem 428 may include wired and/or wireless communication devices compatible with one or more different communication protocols. As non-limiting examples, communication subsystem 428 may be configured for communication via a wireless telephone network, or a wired or wireless local- or wide-area network. In some embodiments, communication subsystem 428 may allow display system 400 to send and/or receive messages to and/or from other devices via a network such as the Internet.

Display subsystem 434 may include one or more lenses 432, such that images may be displayed via lenses 432 (e.g. via projection onto lenses 432, waveguide system(s) incorporated into lenses 432, and/or in any other suitable manner). Display subsystem 434 may include a backlight anti a microdisplay, such as liquid-crystal display (LCD) or liquid crystal on silicon (LCOS) display, in combination with one or more light-emitting diodes (LEDs), laser diodes, and/or other light sources. In other examples, the display subsystem 434 may utilize quantum-dot display technologies, active-matrix organic LED (OLED) technology, and/or any other suitable display technologies.

Head-mounted display system 400 is described for the purpose of example, and thus is not meant to be limiting. It is to be understood that head-mounted display system 400 may include additional and/or alternative sensors, cameras, microphones, input devices, output devices, etc. than those shown without departing from the scope of this disclosure. Head-mounted display system 400 may be implemented as a virtual reality system, or a video or optical augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on head-mounted display system 400 or other suitable display system, or may be executable remotely on a computing system in communication with head-mounted display system 400.

The subject matter of the present disclosure is further described in the following paragraphs. One aspect provides a computing system comprising a logic machine and a storage machine holding instructions executable by the logic machine to receive, for each of a plurality of head-mounted display devices, vantage point data, determine, for each of the plurality of head-mounted display devices, whether one or more other head-mounted display devices are within a vantage point scope of that head-mounted display device, the vantage point scope being based on and associated with the vantage point data of that head-mounted display device, and constrain, for each of one or more head-mounted display devices, delivery of communication data from that head-mounted display device to one or more of the plurality of head-mounted display devices, such constraint based on whether that head-mounted display device is within the vantage point scope of one or more of the plurality of head-mounted display devices. In this aspect, determining whether the one or more other head-mounted display devices are within the vantage point scope of that head-mounted display device alternatively or additionally may include determining whether the one or more other head-mounted display devices are within a field-of-view of that head-mounted display device. In this aspect, determining whether the one or more other head-mounted display devices are within the vantage point scope of that head-mounted display device alternatively or additionally may include determining whether the one or more other head-mounted display devices are approaching a field-of-view of that head-mounted display device from a region of interest outside of the field-of-view. In this aspect, determining whether the one or more other head-mounted displays are within the vantage point scope alternatively or additionally may comprise including a prioritized head-mounted display device in the vantage scope and excluding a deprioritized head-mounted display device from the vantage scope according to a head-mounted display device prioritization. In this aspect, the deprioritized head-mounted display device alternatively or additionally may be substantially stationary. In this aspect, the deprioritized head-mounted display device alternatively or additionally may be inactive. In this aspect, the deprioritized head-mounted display device alternatively or additionally may be occluded from the perspective of that head-mounted display device. In this aspect, determining whether the one or more head-mounted display devices are within the vantage point scope alternatively or additionally may include identifying a maximum number of head-mounted display devices within the vantage point scope such that additional head-mounted display devices exceeding the maximum number are excluded from the vantage point scope. In this aspect, the instructions alternatively or additionally may be executable by the logic machine to receive, for each of the plurality of head-mounted display devices, state data regarding a state of that head-mounted display device. In this aspect, the computing system alternatively or additionally may be a server computing device communicatively coupled to the plurality of head-mounted display devices. In this aspect, the computing system alternatively or additionally may be a cloud network communicatively coupled to the plurality of head-mounted display devices.

Another aspect provides, at a computing device, a method comprising receiving, for each of a plurality of head-mounted display devices, vantage point data, determining, for each of the plurality of head-mounted display devices, whether one or more other head-mounted display devices are within a vantage point scope of that head-mounted display device, the vantage point scope being based on and associated with the vantage point data of that head-mounted display device, and constraining, for each of one or more head-mounted display devices, delivery of communication data from that head-mounted display device to one or more of the plurality of head-mounted display devices, such constraint based on whether that head-mounted display device is within the vantage point scope of one or more of the plurality of head-mounted display devices. In this aspect, determining whether the one or more other head-mounted display devices are within the vantage point scope of that head-mounted display device alternatively or additionally may include determining whether the one or more other head-mounted display devices are within a field-of-view of that head-mounted display device. In this aspect, determining whether the one or more other head-mounted display devices are within the vantage point scope of that head-mounted display device alternatively or additionally may include determining whether the one or more other head-mounted display devices are approaching a field-of-view of that head-mounted display device from a region of interest outside of the field-of-view. In this aspect, determining whether the one or more other head-mounted displays are within the vantage point scope alternatively or additionally may comprise including a prioritized head-mounted display device in the vantage scope and excluding a deprioritized head-mounted display device from the vantage scope according to a head-mounted display device. In this aspect, the deprioritized head-mounted display device alternatively or additionally may be substantially stationary. In this aspect, the deprioritized head-mounted display device alternatively or additionally may be inactive. In this aspect, the deprioritized head-mounted display device alternatively or additionally may be occluded from the perspective of that head-mounted display device. In this aspect, determining whether the one or more head-mounted display devices are within the vantage point scope alternatively or additionally may include identifying a maximum number of head-mounted display devices within the vantage point scope such that additional head-mounted display devices exceeding the maximum number are excluded from the vantage point scope.

Another aspect provides a computing device comprising a logic machine and a storage machine holding instructions executable by the logic machine to receive, for each of a plurality of head-mounted display devices, vantage point data, determine, for each of the plurality of head-mounted display devices, whether one or more other head-mounted display devices are within a vantage point scope of that head-mounted display device, the vantage point scope being based on and associated with the vantage point data of that head-mounted display device, and constrain, for each of one or more head-mounted display devices, delivery of communication data from that head-mounted display device to one or more of the plurality of head-mounted display devices, such constraint based on whether that head-mounted display device is within the vantage point scope of one or more of the plurality of head-mounted display devices, and on a priority such that delivery of communication data is prioritized for a higher priority head-mounted display over a lower priority head-mounted display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
a logic machine; and
a storage machine holding instructions executable by the logic machine to:
receive, for each of a plurality of head-mounted display devices, vantage point data via a network;
determine, for each of the plurality of head-mounted display devices, whether one or more other head-mounted display devices are within a vantage point scope of that head-mounted display device, the vantage point scope being based on and associated with the vantage point data of that head-mounted display device and one or more network conditions of the network, such that the vantage point scope of that head-mounted display device is constrained in response to observing a reduced bandwidth and/or a reduced throughput of the network; and
constrain, for each of one or more head-mounted display devices, delivery of communication data from that head-mounted display device to a subset of the plurality of head-mounted display devices via the network, such that if that head-mounted display device is within the vantage point scope of one or more of the plurality of head-mounted display devices, the delivery of communication data from that head-mounted display device is enabled, and if that head-mounted display device is not within the vantage point scope of one or more of the plurality of head-mounted display devices, the delivery of communication data from that head-mounted display device is disabled.

2. The computing system of claim 1, where determining whether the one or more other head-mounted display devices are within the vantage point scope of that head-mounted display device includes determining whether the one or more other head-mounted display devices are within a field-of-view of that head-mounted display device.

3. The computing system of claim 1, where determining whether the one or more other head-mounted display devices are within the vantage point scope of that head-mounted display device includes determining whether the one or more other head-mounted display devices are approaching a field-of-view of that head-mounted display device from a region of interest outside of the field-of-view.

4. The computing system of claim 1, where determining whether the one or more other head-mounted displays are within the vantage point scope comprises including a prioritized head-mounted display device in the vantage point scope and excluding a deprioritized head-mounted display device from the vantage point scope according to a head-mounted display device prioritization.

5. The computing system of claim 4, where the deprioritized head-mounted display device is substantially stationary.

6. The computing system of claim 4, where the deprioritized head-mounted display device is inactive.

7. The computing system of claim 4, where the deprioritized head-mounted display device is occluded from the perspective of that head-mounted display device.

8. The computing system of claim 1, where determining whether the one or more head-mounted display devices are within the vantage point scope includes identifying a maximum number of head-mounted display devices within the vantage point scope such that additional head-mounted display devices exceeding the maximum number are excluded from the vantage point scope.

9. The computing system of claim 1, where the computing system is a server computing device communicatively coupled to the plurality of head-mounted display devices.

10. The computing system of claim 1, where the computing system is a cloud network communicatively coupled to the plurality of head-mounted display devices.

11. At a computing device, a method, comprising:
receiving, for each of a plurality of head-mounted display devices, via a network, vantage point data;
determining, for each of the plurality of head-mounted display devices, whether one or more other head-mounted display devices are within a vantage point scope of that head-mounted display device, the vantage point scope being based on and associated with the vantage point data of that head-mounted display device and one or more network conditions of the network, such that the vantage point scope of that head-mounted display device is constrained in response to observing a reduced bandwidth and/or a reduced throughput of the network; and
constraining, for each of one or more head-mounted display devices, delivery of communication data from that head-mounted display device to a subset of the plurality of head-mounted display devices via the network, such that if that head-mounted display device is within the vantage point scope of one or more of the plurality of head-mounted display devices, the delivery of communication data from that head-mounted display device is enabled, and if that head-mounted display device is not within the vantage point scope of one or more of the plurality of head-mounted display devices, the delivery of communication data from that head-mounted display device is disabled.

12. The method of claim 11, where determining whether the one or more other head-mounted display devices are within the vantage point scope of that head-mounted display device includes determining whether the one or more other head-mounted display devices are within a field-of-view of that head-mounted display device.

13. The method of claim 11, where determining whether the one or more other head-mounted display devices are within the vantage point scope of that head-mounted display device includes determining whether the one or more other head-mounted display devices are approaching a field-of-view of that head-mounted display device from a region of interest outside of the field-of-view.

14. The method of claim 11, where determining whether the one or more other head-mounted displays are within the vantage point scope comprises including a prioritized head-mounted display device in the vantage point scope and excluding a deprioritized head-mounted display device from the vantage point scope according to a head-mounted display device.

15. The method of claim 14, where the deprioritized head-mounted display device is substantially stationary.

16. The method of claim 14, where the deprioritized head-mounted display device is inactive.

17. The method of claim 14, where the deprioritized head-mounted display device is occluded from the perspective of that head-mounted display device.

18. The method of claim 11, where determining whether the one or more head-mounted display devices are within the vantage point scope includes identifying a maximum number of head-mounted display devices within the vantage point scope such that additional head-mounted display devices exceeding the maximum number are excluded from the vantage point scope.

19. A computing device, comprising:
a logic machine; and
a storage machine holding instructions executable by the logic machine to:
receive, for each of a plurality of head-mounted display devices, vantage point data via a network;
determine, for each of the plurality of head-mounted display devices, whether one or more other head-mounted display devices are within a vantage point scope of that head-mounted display device, the vantage point scope being based on and associated with the vantage point data of that head-mounted display device and one or more network conditions of the network, such that the vantage point scope of that head-mounted display device is constrained in response to observing a reduced bandwidth and/or a reduced throughput of the network; and
constrain, for each of one or more head-mounted display devices, delivery of communication data from that head-mounted display device to a subset of the plurality of head-mounted display devices via the network, such that if that head-mounted display device is within the vantage point scope of one or more of the plurality of head-mounted display devices, the delivery of communication data from that head-mounted display device is enabled, and if that head-mounted display device is not within the vantage point scope of one or more of the plurality of head-mounted display devices, the delivery of communication data from that head-mounted display device is disabled, such constraint also based on a priority such that delivery of communication data is prioritized for a higher priority head-mounted display over a lower priority head-mounted display.

* * * * *